US006688164B2

(12) United States Patent
Landschoff

(10) Patent No.: US 6,688,164 B2
(45) Date of Patent: Feb. 10, 2004

(54) METHOD FOR CONTROLLING AN INTERNAL COMBUSTION ENGINE

(75) Inventor: Otwin Landschoff, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/089,954

(22) PCT Filed: Jul. 20, 2001

(86) PCT No.: PCT/DE01/02748

§ 371 (c)(1), (2), (4) Date: Aug. 9, 2002

(87) PCT Pub. No.: WO02/12699

PCT Pub. Date: Feb. 14, 2002

(65) Prior Publication Data

US 2003/0019480 A1 Jan. 30, 2003

(30) Foreign Application Priority Data

Aug. 5, 2000 (DE) ........................................ 100 38 335

(51) Int. Cl.[7] ........................ G01M 15/00; G01M 19/00
(52) U.S. Cl. ..................................... 73/117.3; 73/118.2
(58) Field of Search ............................ 73/117.3, 118.2, 73/118.1, 116; 123/479

(56) References Cited

U.S. PATENT DOCUMENTS

| | | |
|---|---|---|
| 5,381,775 A | 1/1995 | Birk et al. |
| 5,505,179 A | 4/1996 | Brennan |
| 5,698,780 A | 12/1997 | Mizutani et al. |

FOREIGN PATENT DOCUMENTS

| | | |
|---|---|---|
| DE | 40 32 451 | 4/1992 |
| DE | 199 27 674 | 12/2000 |
| EP | 0 905 358 | 3/1999 |

*Primary Examiner*—Edward Lefkowtiz
*Assistant Examiner*—Maurice Stevens
(74) *Attorney, Agent, or Firm*—Kenyon & Kenyon

(57) ABSTRACT

A method and a device for controlling an internal combustion engine, including a sensor for detecting a pressure variable characterizing the pressure of the air supplied to the internal combustion engine. The performance reliability of the sensor is monitored and a substitute signal is used in case of a fault. To determine the substitute signal, a static substitute value is defined on the basis of variables that characterize the operating state of the internal combustion engine. The static substitute value is filtered by a filter having a delay component, in order to generate the substitute signal.

7 Claims, 3 Drawing Sheets

METHOD FOR CONTROLLING AN INTERNAL COMBUSTION ENGINE

FIELD OF THE INVENTION

The present invention relates to a method and a device for controlling an internal combustion engine.

BACKGROUND INFORMATION

A method and a device for controlling an internal combustion engine are discussed in the German Published Patent Application No. 40 32 451. A sensor may be used for detecting a pressure variable that may characterize the pressure of the air supplied to the internal combustion engine. The performance reliability of the sensor may be monitored and a substitute signal may be used in case of a fault. If a fault is present, the output signal of a second sensor may be used as a substitute value. This method may require an additional sensor.

SUMMARY OF THE INVENTION

By using a static substitute value based on quantities characterizing the operating state of the internal combustion engine in determining the substitute signal, a substitute value may be provided in a simple and cost-effective manner. The static substitute value, defined for generating the substitute signal, may be filtered by a filter having a delay component. As a result of such filtering, dynamic effects may be taken into account. For instance, the charge-air pressure may have a delayed reaction in response to a change in the fuel quantity and/or rotational speed. Therefore, a precise simulation may only be provided if the output variable of the simulation has a delayed change in response to a change in the input variables.

A further improvement in the simulation may result if the response characteristic of the filter is specifiable as a function of operating characteristics.

The rotational speed of the internal combustion engine and/or the time derivative of the pressure variable may be suitable in this context. At different speeds, different time constants may be selected for the filter. Correspondingly, different time constants may be selected at rising and falling speeds. In this manner, the simulation may be more precisely adapted to the actual behavior of the signal.

A fault of the sensor may be recognized when a change in a variable characterizing the fuel quantity to be injected does not result in a change in the signal. In this manner, a reliable and simple fault detection may be made provided.

DETAILED DESCRIPTION

In the following, an exemplary method of the present invention is described using a charge-air pressure sensor. However, the present invention may not be limited to this application. The exemplary method according to the present invention may be used with sensors in which a change in an operating characteristic results in a corresponding change in the sensor's output signal. In particular, the exemplary method in accordance with the present invention may also be used in a sensor for detecting the air mass or a quantity correlated to the charge-air pressure or a quantity characterizing the charge-air pressure. In particular, the exemplary method may be used with a sensor for detecting air mass.

Figure 1:
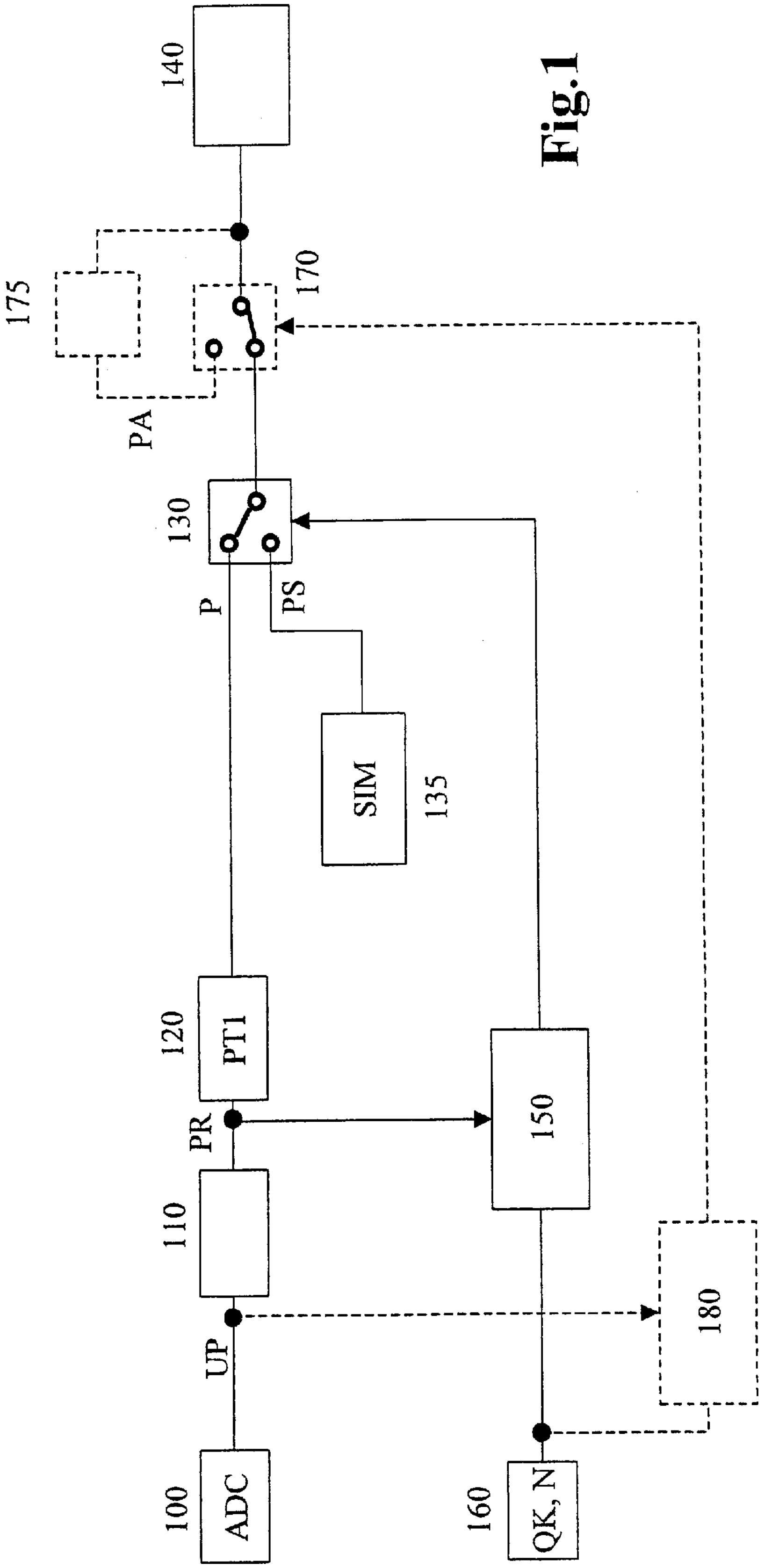
FIG. 1 shows a block diagram of an examplary embodiment of a system for detecting the charge-air pressure.

In FIG. 1, a sensor for detecting charge-air pressure and the associated analog/digital converter are denoted by the reference numeral 100. The sensor supplies a signal UP, which corresponds to the charge-air pressure, to a characteristic curve 110. There, this quantity is converted into a signal PR, which in turn is transmitted to a filter 120. Via a first switching arrangement 130, output signal P of filter 120 arrives at control 140, which then further processes this signal in order to appropriately control the internal combustion engine or actuators mounted on the internal combustion engine.

At the second input of first switching arrangement 130, an output signal PS of a simulation 135 is available. This simulation 135 calculates a simulated charge-air pressure PS on the basis of different variables.

Switching arrangement 130 is controllable by a first monitor 150. This means that, in case of a recognized fault, the first monitor switches first switching arrangement 130 into such a position that output signal PS of simulation 135 arrives at control 140. First monitor 150 evaluates signals from various sensors 160, which characterize, for example, fuel quantity QK to be injected and/or rotational speed N of the internal combustion engine. Furthermore, output signal PR of characteristics map 110 may be evaluated for the purpose of fault monitoring. Alternatively or in addition, output signal P of filter 120 and output signal UP of the A/D converter of sensor 100, respectively, may also be directly processed.

A further exemplary embodiment is depicted by a dotted line. In this case, a second switching arrangement 170 is arranged between first switching arrangement 130 and control 140, second switching arrangement 170 being controlled by a second monitor 180. If a fault is recognized, second monitor 180 controls switching arrangement 170 in such a manner that output signal PA of a delay 175 arrives at control 140. This has the effect that, if a fault has been recognized, the value last recognized as faultless will continue to be used.

The sensor's output signal, which is provided by an A/D converter, is converted by characteristics map 110 into a quantity PR corresponding to the pressure. After the first monitor and/or the second monitor has/have evaluated the different signals, various faults are recognized.

By appropriately controlling first switching arrangement 130 and/or second switching arrangement 170, a substitute value PS or an earlier stored value PA may be used as a substitute value by control 140 in the control of the internal combustion engine in case of a fault. For this purpose, delay 175 stores the value last recognized as faultless. This old value PA stored in delay 175 is then used in the control of the internal combustion engine.

Different faults may be recognized by the first monitor and/or the second monitor. For instance, a signal-range check may be provided at a minimum and/or a maximum value for signal UP and signal PR, respectively. Furthermore, a plausibility check by a further sensor, such as an atmospheric air-pressure sensor, may be implemented given particular operating conditions.

In addition, in accordance with the present invention, a plausibility test may be implemented using the injection quantity and/or some other operating characteristic having an important influence on charge-air pressure. This plausibility test may be performed in such a manner that a fault is recognized when a change in the operating characteristic does not result in a corresponding change in the output quantity of the sensor.

A quantity characterizing the injected fuel quantity may be used as an operating characteristic. For this purpose, a setpoint value for the fuel quantity to be injected and/or a controlled variable used in the control of a fuel-quantity determining actuator may be used. For instance, the control duration of an electromagnetic valve or a piezomagnetic valve may be suitable. This monitoring is depicted in more detail in FIG. 2.

Figure 3:
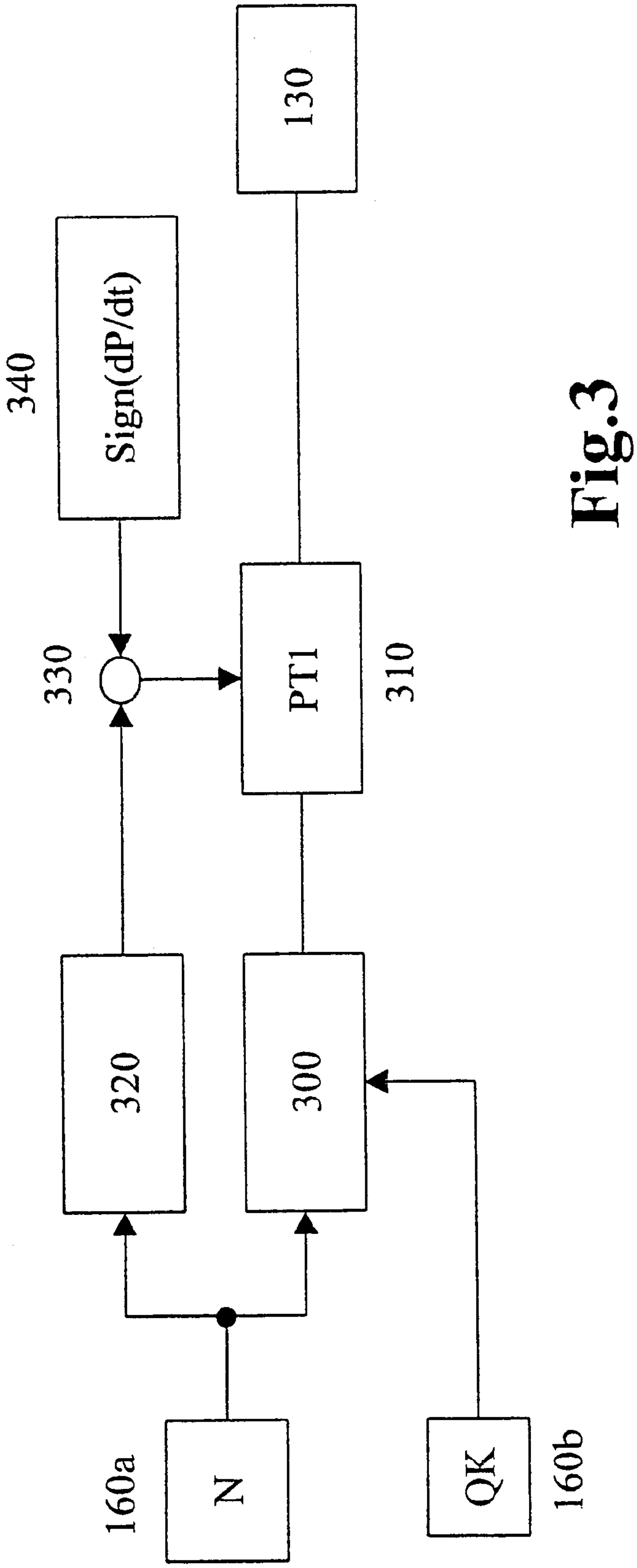
FIG. 3 shows a block diagram representing a formation of a substitute value for the charge-air pressure.

If a corresponding fault is recognized, first switching arrangement 130 switches to simulated substitute signal PS. This means that the functioning of the sensor is monitored and substitute signal PS is used in case of a fault. The substitute signal is detected using quantities characterizing the operating state of the internal combustion engine. The value formed in such a manner is additionally filtered by a filter having a delaying component. FIG. 3 shows in detail how the substitute value is formed.

Figure 2:
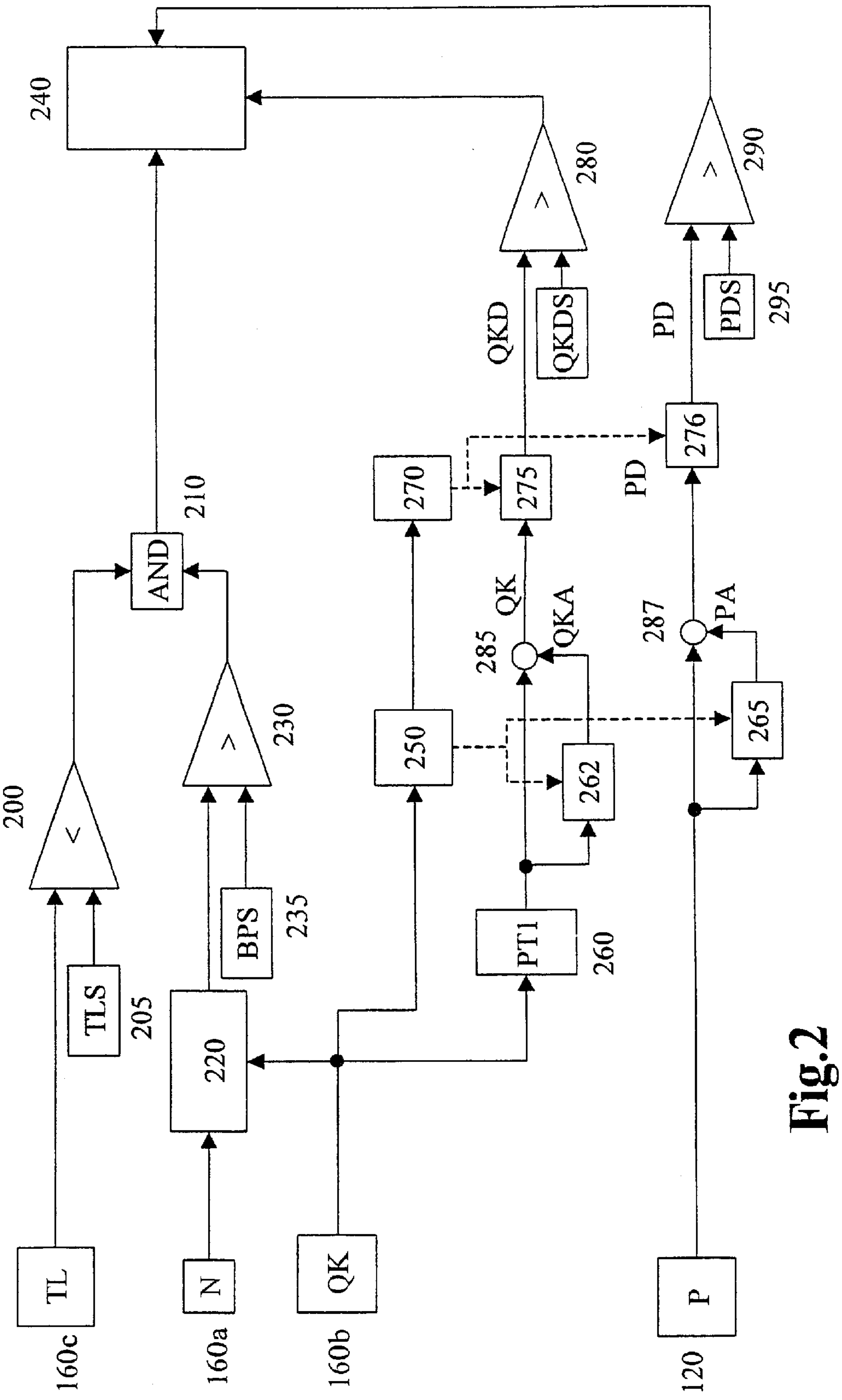
FIG. 2 shows a detailed representation of a monitoring of the charge-air pressure.

First monitor 150 is shown in more detail in FIG. 2 via an example. In particular operating states, it may occur that charge-air pressure UP remains constant, although the actual air-charge pressure is changing. Such a fault may also be referred to as freezing of the sensor. To detect this fault, the fault monitoring shown in FIG. 2 is implemented.

According to the present invention, the monitoring is only performed in certain operating states. Given such an operating state, in which the charge-air temperature is below a threshold value TLS, and the rotational speed and the fuel quantity to be injected are within certain value ranges, the current quantity and the currently existing charge-air pressure are stored as old values QKA and PA, respectively, after changing the preceding sign when changing the fuel quantity to be injected. A time meter is activated simultaneously. After a delay has elapsed, difference QKD between the old stored value QKA and the now current value QK of the injection quantity is formed. In a corresponding manner, change PD of the pressure is also determined during this delay.

If the amount of the difference between the fuel quantity values is greater than a threshold value QKDS, the amount of the change in air-charge pressure may also need to be greater than a threshold value PDS. If this is not the case, a fault is detected.

In FIG. 2, an exemplary embodiment of such a monitoring device is represented via example. Output signal TL of a temperature sensor 160*c*, which provides a signal corresponding to the charge-air temperature, is supplied to a first comparator 200. In addition, a threshold value TLS is conveyed to comparator 200 by a threshold input 205. Comparator 200 applies a corresponding signal to an AND gate 210. The output signal of a characteristics map 220 is transmitted to a second comparator 230, at whose input rotational speed signal N of a speed sensor 160*a* is available. In addition, characteristics map 220 processes a quantity QK, characterizing the fuel quantity to be injected and which may be provided by a device for controlling injected fuel-quantity 160*b*. Furthermore, a threshold value BPS is transmitted to comparator 230 by a threshold input 235. Comparator 230 also applies a corresponding signal to AND gate 210.

Quantity QK also arrives at a preceding-sign detector 250 and a filter 260. The output signal of preceding-sign detector 250 is applied to a time counter 270 as well as a first memory 262 and a second memory 265. The output signal of filter 260, having a positive preceding sign, first of all arrives directly at a node 285 and then, via first memory 262, with a negative preceding sign, at a second input of node 285. Node 285 applies a quantity QKD to a switching arrangement 275. The output signal QKD of switching arrangement 275 arrives at a third comparator 280, at whose second input, output signal QKDS of a threshold input 285 is available. Evaluator 240 also receives the output signal of comparator 280.

Output signal P of filter 120, with a positive preceding sign, first arrives directly at a node 287 and then, via second memory 265, with a negative preceding sign, at a second input of node 287. Node 287 applies a quantity PD to switching arrangement 276. The output signal PD of switching arrangement 276 arrives at a fourth comparator 290, at whose second input output signal PDS of a threshold input 295 is available. The output signal of comparator 290 is also applied to evaluator 240.

First comparator 200 compares measured charge-air temperature TL with threshold value TLS. If measured charge-air temperature TL is lower than threshold value TLS, a corresponding signal arrives at AND gate 210. Based on at least the rotational speed and/or the fuel quantity to be injected, characteristics map 220 forms a characteristic value, which characterizes the operating state of the internal combustion engine. This characteristic value is compared in comparator 230 with threshold value BTS. If the characteristic value for the operating state is greater than threshold value BPS, a corresponding signal is transmitted to AND gate 210. If both conditions are satisfied, i.e. if the air temperature is lower than threshold value TLS, and given particular operating states, monitoring may be provided.

This logic unit, having comparators 200 and 230, threshold inputs 205 and 235, characteristics map 220 and the AND gate, has the effect of implementing the monitoring of the sensor signal as a function of the presence of certain operating states. Monitoring is only implemented if the air temperature is lower than a threshold value and if certain values for the rotational speed and/or the fuel quantity to be injected are given.

Preceding-sign detector 250 examines whether a preceding-sign change is present in the change of the fuel quantity, i.e. it is examined whether the time derivative of the fuel quantity to be injected includes a zero crossing. If this is the case, the current values of the fuel quantity to be injected are stored as old value QKA in memory 262. Correspondingly, the current value of the pressure is stored as old value PA in second memory 265. The fuel quantity to be injected may be filtered by filter 260 prior to storing.

Time counter 270 is activated simultaneously with the detected change in the preceding sign. Based on current value QK and old value QKA of the fuel quantity to be injected, a differential value QKD is formed in node 285, which indicates the change in the fuel quantity since the last preceding-sign change. Similarly, a corresponding differential value PD is formed in node 287 for the pressure, which characterizes the change in charge-air since the last change in the preceding sign. If the time counter has elapsed, i.e., if a certain delay since the last change in preceding signs has been satisfied, differential signal QKD is compared by comparator 280 to a threshold value QKDS. Differential pressure PD is compared in a similar manner in node 290 to a corresponding threshold value PDS. If the two values for the difference in fuel quantity QKD and differential pressure PD are in each case greater than the threshold value, the device does not identify a fault. If only the difference of fuel quantity QKD is greater than the threshold value, and value PD for the pressure is lower than threshold value PDS, the device identifies a fault. In this case, monitor 150, i.e. evaluator 240, inputs an appropriate signal for controlling switchover 130.

The method described herein is an exemplary embodiment. Other exemplary embodiments may also be provided. For example, other program steps may perform the check test. A fault may be identified when a change in an operating characteristic occurs, such as the fuel quantity to be injected, does not result in a corresponding change in charge-air pressure. If, after a preceding-sign change in the change of the fuel quantity, a change in the fuel quantity correlates with a change in the pressure variable, no fault is present.

Other variables characterizing the fuel quantity to be injected may be used instead of the fuel quantity, that is, those variables that are a function of the fuel quantity or are determined as a function of the fuel quantity. For instance, a load variable may be used, such as, for example, a torque variable and/or a control variable of a fuel-quantity control element.

FIG. 3 shows simulation 135 in more detail. Components already described in FIG. 1 are identified by corresponding reference numerals. Signal N of rotational speed sensor **160*a* and signal QK regarding the injected fuel quantity arrive at a characteristics map 300, whose output variable arrives at switching arrangement 130 via a filter 310. Rotational speed N also arrives at filter 310, via a characteristic curve 320 and a node 330. At the second input of node 330, the output signal of a preceding-sign detector 340** is available.

A value for charge-air pressure P is stored in characteristics map 300 as a function of the operating state of the internal combustion engine. This stored value corresponds to charge-air pressure in the static state. In order to be able to take dynamic states into account, filter arrangement 310 is provided. This filter arrangement 310 may be configured as PT1-filter and may simulate the time characteristic of the pressure when a change occurs in the operating state. The response characteristic of this filter arrangement 310 may be varied as a function of the operating state of the internal combustion engine. Characteristic curve 320 is provided particularly for this purpose, in which, as a function of rotational speed N, a variable is stored that determines the response characteristic of filter arrangement 310.

The time constant for the filter may be smaller at large rotational speeds, and larger in case of low rotational speed. The response characteristic is determined by preceding-sign detector 340, which inputs a correction value for correcting the output signal of characteristic curve 320 as a function of the preceding sign of the pressure change. Preceding-sign detector 340 determines whether the pressure is rising or falling.

A larger time constant may be chosen for the filter when the pressure is rising than when the pressure is falling.

The output signal of characteristics map 300 and also the output signal of filter arrangement 310 may be used as input variables in detecting the preceding sign. Using a specifiable value, an additive and/or a multiplicative correction of the output signal, which is a function of speed of characteristics map 320, is implemented.

In accordance with the present invention, the response characteristic of filter 310 is specified as a function of the speed of the internal combustion engine and the change direction of the pressure.

What is claimed is:

1. A method for controlling an internal combustion engine including a sensor, the method comprising:

detecting with the sensor a pressure variable characterizing a pressure of air supplied to the internal combustion engine;

monitoring a performance reliability of the sensor for a fault;

defining a static substitute value based on at least one variable characterizing an operating state of the internal combustion engine;

filtering the static substitute value with a filter having a delay component;

determining a substitute signal using the filtered static substitute value;

using the substitute signal if the fault occurs; and specifying a response characteristic of the filter as a function of an operating parameter.

2. The method of claim 1, wherein the response characteristic is specifiable as a function of a speed.

3. The method of claim 1, wherein the response characteristic is specifiable based on a time derivative of the pressure variable.

4. The method of claim 1, wherein the at least one variable characterizing the operating state of the internal combustion engine include at least one of a rotational speed and a fuel quantity to be injected.

5. The method of claim 1, wherein the substitute signal is used if an output signal of the sensor is recognized as being the fault.

6. A method for controlling an internal combustion engine including a sensor, the method comprising:

detecting with the sensor a pressure variable characterizing a pressure of air supplied to the internal combustion engine;

monitoring a performance reliability of the sensor for a fault; defining a static substitute value based on at least one variable characterizing an operating state of the internal combustion engine;

filtering the static substitute value with a filter having a delay component;

determining a substitute signal using the filtered static substitute value;

using the substitute signal if the fault occurs; and recognizing a signal as being the fault if a change in a variable characterizing a fuel quantity to be injected does not result in a change in the signal.

7. A device for controlling an internal combustion engine, the device comprising:

a sensor to detect a pressure variable characterizing a pressure of air supplied to the internal combustion engine;

an monitoring arrangement to monitor a performance reliability of the sensor, and being operable to use a substitute signal if a fault occurs;

a determining arrangement to determine a substitute signal, the determining arrangement including a filter having a delay component to generate the substitute signal by filtering a static substitute value defined on a basis of at least one variable characterizing an operating state of the internal combustion engine; and an arrangement for specifying a response characteristic of the filter as a function of an operating parameter.

* * * * *